(12) United States Patent
Jarisch et al.

(10) Patent No.: US 9,268,984 B2
(45) Date of Patent: Feb. 23, 2016

(54) SUPPORT AND CAPSULE FOR PREPARING A BEVERAGE BY CENTRIFUGATION, SYSTEM AND METHOD FOR PREPARING A BEVERAGE BY CENTRIFUGATION

(71) Applicant: NESTEC S. A., Vevey (CH)

(72) Inventors: Christian Jarisch, Lutry (CH); Stefan Kaeser, Aarau (CH); Arnaud Gerbaulet, Oye et Pallet (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/350,699

(22) PCT Filed: Nov. 14, 2012

(86) PCT No.: PCT/EP2012/072584
§ 371 (c)(1),
(2) Date: Apr. 9, 2014

(87) PCT Pub. No.: WO2013/072351
PCT Pub. Date: May 23, 2013

(65) Prior Publication Data
US 2014/0252093 A1    Sep. 11, 2014

(30) Foreign Application Priority Data
Nov. 16, 2011    (EP) ..................................... 11189414

(51) Int. Cl.
*G06K 5/00*      (2006.01)
*G06K 7/10*      (2006.01)
(Continued)

(52) U.S. Cl.
CPC ............. *G06K 7/10821* (2013.01); *A47J 31/22* (2013.01); *A47J 31/4492* (2013.01);
(Continued)

(58) Field of Classification Search
CPC .......... G06K 2019/06243; G06K 2019/06253; G06K 19/06018; G06K 7/1421; G06K 19/06075; G06K 19/06168; B65D 1/265
USPC .......................................................... 235/437
See application file for complete search history.

(56) References Cited

U.S. PATENT DOCUMENTS 3,585,367 A * 6/1971 Humbarger .................... 235/454
3,636,317 A * 1/1972 Torrey .......................... 235/494
(Continued)

FOREIGN PATENT DOCUMENTS

DE      102010002439       9/2011
EP          1006529 A2 *   6/2000   ............. G11B 23/30
(Continued)

OTHER PUBLICATIONS

Taiwan Search Report for Application No. 101142925, dated Mar. 26, 2015, 4 pages.
(Continued)

*Primary Examiner* — Thien M Le
*Assistant Examiner* — Claude J Brown
(74) *Attorney, Agent, or Firm* — K&L Gates LLP (57) ABSTRACT

The invention relates to a code support (60a, 60b) adapted to be associated with or part of a capsule intended for delivering a beverage in a beverage producing device by centrifugation of the capsule. The support comprises a code formed by at least a first sequence of symbols and a second sequence of symbols. The code is represented on the support so that each symbol is sequentially readable by a reading arrangement (100) of an external reading device while the capsule is driven in rotation along an axis of rotation (Z). The first sequence comprises at least one first preamble sequence of symbols, and at least one first data sequence of symbols. The second sequence comprises at least one second preamble sequence of symbols and at least one second data sequence of symbols. The first preamble sequence is distinct from the second preamble sequence.

24 Claims, 6 Drawing Sheets

(51) Int. Cl.
*A47J 31/22* (2006.01)
*A47J 31/44* (2006.01)
*G06K 19/06* (2006.01)
*G06K 7/14* (2006.01)

(52) U.S. Cl.
CPC ....... *G06K 7/1473* (2013.01); *G06K 19/06009* (2013.01); *G06K 19/06028* (2013.01); *G06K 19/06075* (2013.01); *G06K 19/06168* (2013.01); *G06K 2019/0629* (2013.01); *G06K 2019/06253* (2013.01); *G06K 2019/06271* (2013.01)

(56) References Cited

U.S. PATENT DOCUMENTS

| | | | | |
|---|---|---|---|---|
| 4,250,405 | A * | 2/1981 | Ashcroft et al. | 235/456 |
| 4,983,815 | A * | 1/1991 | Kumasaka | 235/376 |
| 5,216,234 | A * | 6/1993 | Bell | 235/494 |
| 5,260,556 | A * | 11/1993 | Lake et al. | 235/494 |
| 5,798,514 | A * | 8/1998 | Domanik | 235/462.03 |
| 5,928,971 | A | 7/1999 | Ellis et al. | |
| 6,144,742 | A * | 11/2000 | Gotoh et al. | 369/53.21 |
| 6,209,435 | B1 * | 4/2001 | Miyazaki et al. | 83/665 |
| 6,527,181 | B1 | 3/2003 | Kleeberg et al. | |
| 7,607,385 | B2 | 10/2009 | Halliday et al. | |
| 2002/0014531 | A1 * | 2/2002 | Murphy et al. | 235/462.03 |
| 2002/0048621 | A1 | 4/2002 | Boyd et al. | |
| 2003/0076775 | A1 * | 4/2003 | Sato et al. | 369/275.3 |
| 2003/0121979 | A1 * | 7/2003 | D'Haens et al. | 235/462.03 |
| 2003/0179688 | A1 * | 9/2003 | Blankenbeckler et al. | 369/275.3 |
| 2004/0256175 | A1 | 12/2004 | Gnadig | |
| 2005/0150664 | A1 | 7/2005 | Miller et al. | |
| 2006/0083155 | A1 * | 4/2006 | Shimizu et al. | 369/275.4 |
| 2006/0239742 | A1 * | 10/2006 | Bateman et al. | 400/208 |
| 2007/0271689 | A1 | 11/2007 | Baldwin | |
| 2009/0140097 | A1 | 6/2009 | Collier et al. | |
| 2010/0078480 | A1 | 4/2010 | Aker | |
| 2013/0233914 | A1 * | 9/2013 | Lillard, Jr. | 235/375 |

FOREIGN PATENT DOCUMENTS

| | | | |
|---|---|---|---|
| EP | 1529739 | 5/2005 | |
| EP | 1764015 | 3/2007 | |
| EP | 1764015 A1 * | 3/2007 | ............ A47J 31/06 |
| GB | 1392924 | 5/1975 | |
| JP | 6248878 | 10/1987 | |
| JP | 02180873 | 8/1990 | |
| JP | 2000094838 | 4/2000 | |
| JP | 2007257439 | 10/2007 | |
| WO | 0228241 | 4/2002 | |
| WO | 2005044067 | 5/2005 | |
| WO | WO 2005106769 A2 * | 11/2005 | |
| WO | 2008134910 | 11/2008 | |
| WO | 2010026053 | 3/2010 | |
| WO | 2011076750 | 6/2011 | |
| WO | 2011155968 | 12/2011 | |

OTHER PUBLICATIONS

Victrex, APTIV Films. http://web.archive.org/web/20090724075635/htttp://www.victrex.com/en/products/aptiv-films/aptiv-films.php and http://web.archive.org/web/20090726100407/http://www.victrex.com/en/products/aptiv-films/properties/properties.php. Jul. 2009.

Hacking the Tassimo Single Serve Coffee Machine, Nov. 29, 2007. Retrieved from Internet URL: <http://blog.chapmanconsulting.ca/post/2007/11/29/Hacking-the-Tassimo-single-serve-coffee-machine.aspx>.

WO 2005044067 Espacenet Machine Translation.

PCT International Search Report for Application No. PCT/EP2011/057670 with a Mailing Date of Aug. 25, 2011; 4 pages.

Written Opinion of the PCT International Search Report for Appliaction No. PCT/EP2011/057670 with a Mailing Date of Aug. 25, 2011; 6 pages.

* cited by examiner

SUPPORT AND CAPSULE FOR PREPARING A BEVERAGE BY CENTRIFUGATION, SYSTEM AND METHOD FOR PREPARING A BEVERAGE BY CENTRIFUGATION

CROSS REFERENCE TO RELATED APPLICATIONS

The present application is a National Stage of International Application No. PCT/EP2012/072584, filed on Nov. 14, 2012, which claims priority to European Patent Application No. 11189414.3, filed Nov. 16, 2011, the entire contents of which are being incorporated herein by reference.

FIELD OF THE INVENTION

The invention pertains to the field of the beverage preparation, in particular using capsules containing an ingredient for preparing a beverage in a beverage preparation machine. The present invention relates in particular to optical code supports adapted to store information related to a capsule, capsules associated with/or embedding a code support, reading and processing arrangements for reading and using such information for preparing a beverage.

BACKGROUND OF THE INVENTION

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminium, a recyclable and/or bio-degradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like. Certain beverage preparation machines are arranged to prepare beverages by using a centrifugation extraction process. The principle mainly consists in providing beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

Typically, it is suitable to offer to the user a range of capsules of different types containing different ingredients (e.g., different coffee blends) with specific taste characteristics, to prepare a variety of different beverages (e.g., different coffee types) with a same machine. The characteristics of the beverages can be varied by varying the content of the capsule (e.g., coffee weight, different blends, etc.) and by adjusting key machine parameters such as the supplied liquid volume or temperature, the rotational speed, the pressure pump. Therefore, there is a need for identifying the type of capsule inserted in the beverage machine to enable the adjustment of the brewing parameters to the inserted type. Moreover, it may also be desirable for capsules to embed additional information, for example safety information like use-by date or production data like batch numbers.

WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

It is known from the art, for example in document EP1764015A1, to print locally an identifying barcode on a small area of the circular crown of a coffee wafer for use with a conventional non-centrifugation coffee brewing systems. Said systems comprise a barcode reader to read the identifying barcode on the capsule. Barcode readers or barcode scanners are electronic devices comprising a light source, a lens and a light sensor translating optical impulses into electrical ones. They generally comprise a light-emitting/laser diode, or a camera-type sensor. Barcode readers in beverage preparation machine are adapted to read the barcode either by moving the sensing element across the bars (by moving/changing the orientation of the light source beam to scan the entire code), or by taking an image of the whole code at a time with a light-sensitive array/matrix.

Using such kind of code readers is not adapted to be used in the context of a centrifugation extraction based system having a rotating brewing unit. The use of barcode readers having moving parts like a scanning element may raise severe concerns in term of reliability since it is likely to be exposed to a harsh environment with cyclical vibrations and hot vapors when placed at the immediate vicinity of the rotating brewing unit. Barcode reader with camera-type sensor should be positioned so as to be able to take an image of the whole barcode. As a consequence, the entire code needs to be directly visible from the reader. The free space available in a rotating brewing unit dedicated to a code reader being quite limited, it is generally not possible to meet this visibility requirement.

Whatever the kind of barcode reader used, the geometrical configuration of the rotating brewing units in centrifugation extraction based systems prevents the barcode reader to read a code spread on a large section of the capsule: as a consequence, the dimensions of the barcode are strictly limited, leading to a very low quantity of coded information for a given level of reliability of the readings, typically around 20 bits only. In addition barcode readers are quite expensive.

Reliably reading code printed on a capsule while said capsule is positioned into a rotating brewing unit implies the reliable recognition of sequences of symbols forming said code, in particular in the harsh environment of the rotating brewing unit. Moreover, the code should also be readable, without knowledge by the code reader of the position and/or orientation in which the capsule has been inserted in the capsule holder. Traditional barcodes and other optical coding element known in the art for a capsule fail to meet these requirements.

Co-pending international patent application PCT/EP11/057670 relates to a support adapted to be associated with or be a part of a capsule for the preparation of a beverage. The support comprises a section on which at least one sequence of symbols is represented so as that each symbol is sequentially readable, by a reading arrangement of an external device, while the capsule is driven in rotation along an axis of rotation, each sequence code a set of information related to the capsule. Such invention enables to make a large volume of coded information available, such as about 100 bits of redundant or non-redundant information, without using barcode readers having moving parts like a scanning element which may raise severe concerns in terms of reliability. Another advantage is also to be able to read the code support by rotating the capsule while the capsule is in place, in a ready to brew position in the rotary capsule holder. However, the structure of the sequence code However, there is still a need to improve the pattern and/or structure of the code represented on the support to enhance the reliability of the readings, in the particular conditions met in a centrifugal beverage machine using capsules for the preparation of the beverage. It still exists a need to provide a capsule with a code reliably readable by a code reader without knowledge of the position and/or orientation of said code, when the capsule is positioned in the rotating capsule holder of a centrifugation extraction based system.

BRIEF DESCRIPTION OF THE INVENTION

An object of the invention is to provide means for storing, reading and processing information related to a capsule, more particularly information for identifying said capsule within a production machine and for retrieving or reading information for adjusting working parameters of the machine and/or for controlling parameters for preparing a beverage with said capsule. Another object is to provide a capsule embedding such means.

Another object is to control optimal conditions for preparing a beverage.

Another object is to provide a solution for reliably reading information related to a capsule with a sensor disposed in the machine, for example in the processing module/brewing unit of the machine, where available spaces are quite limited and in a harsh environment (ingredients traces, presence of vapors and liquids, . . . ).

One or more of these objects are met by a capsule, a support, a device or a method according to the independent claim(s). The dependent claims further provide solutions to these objects and/or additional benefits.

More particularly, according to a first aspect, the invention relates to a code support adapted to be associated with or part of a capsule intended for delivering a beverage in a beverage producing device by centrifugation of the capsule. The support comprises a code formed by at least a first sequence of symbols and a second sequence of symbols. The code is represented on the support so that each symbol is sequentially readable by a reading arrangement of an external reading device while the capsule is driven in rotation along an axis of rotation. The first sequence comprises at least one first preamble sequence of symbols, and at least one first data sequence of symbols. The second sequence comprises at least one second preamble sequence of symbols and at least one second data sequence of symbols. The first preamble sequence is distinct from the second preamble sequence.

By providing sequentially readable symbols while the capsule is driven in rotation, the amount of coded data may be raised and/or the area covered by each symbol may be enlarged, improving the overall reliability of the readings. By "sequentially" it should be understood that one or a limited number of symbols (less than the number of symbols comprised in each sequence) are read at a given time: for instance, each symbol can be read separately. As a consequence, at least one reading of all the symbols included in all the sequences in the support can be performed by the reading arrangement after a 360 degrees rotation of the capsule around its axis of rotation.

The first and second preamble sequences allow determining which symbols belong to the first sequence and which symbols belong to the second sequence, without any knowledge of the angular configuration of the code support when it is positioned in the beverage machine. Moreover, a more robust detection of said critical information for decoding the code is obtained thanks to the use of distinct first and second preamble sequences.

For instance, the first preamble sequence may comprise a first 6-bits long sequence $P_A$='10101010', the second 6-bits long sequence $P_B$='010101'. The first sequence may begin with the first sequence $P_A$, then, a first block D1 comprising a data block F1 having n1 bits with parity check bits. The second sequence may begin with the second sequence $P_B$, then, a second block D1 comprising a data block F1 having n2 bits with parity check bits. The position of the first sequence and the second sequence may be then determined by using an algorithm for identifying the pattern $P_A$-X1-$P_B$-X2 where X1 stands for any sequence of n1 bits, X2 stands for any sequence of n2 bits. For example, a Number of Equal Bits (NEB) filter can be used.

The code may comprise more than two sequences, for instance four or five sequences of symbols. In this case, at least two different preamble sequences are used, but preferably, each preamble sequence is chosen to be distinct from the other preamble sequences.

In particular, the set of information may comprise information for recognizing a type associated to the capsule, and/or one or a combination of items of the following list:
  information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc;
  information for retrieving locally and/or remotely parameters for preparing a beverage with the capsule, for example an identifier allowing the recognition of a type for the capsule;
  information related to the manufacturing of the capsule, such a production batch identifier, a date of production, a recommended date of consumption, an expiration date, etc;
  information for retrieving locally and/or remotely information related to the manufacturing of the capsule.

The symbols arranged in sequences are used to represent data conveying the set of information related to the capsule. For instance, each sequence may represent an integer number of bits. Each symbol may encode one or several binary bits. The data may also be represented by transitions between symbols. The symbols may be arranged in the sequence using a modulation scheme, for example a line coding like a Manchester coding.

Each symbol may be represented in the section by an entity having a measurable characteristic, readable by the measuring arrangement, the measurable characteristic varying according to the value conveyed by said symbol. Each symbol may be printed and/or embossed. The shape of the symbols may be chosen amongst the following non-exhaustive list: arch-shaped segments, segments which are individually rectilinear but extend along at least a part of the section, dots, polygons, geometric shapes. The symbols may be readable by an optical sensor included in the reading arrangement, the color and/or the shape of each symbol being chosen according to the value of said symbol. The symbols may be printed by an ink which is not visible by human eyes under natural light e.g., ink visible under UV. The symbols may be printed or embossed by a pattern which possesses surfaces having different reflective and/or absorbing properties to light. The pattern may possesses first surfaces having inclined mirroring or absorbing properties to light and second surfaces having flat mirroring or flat reflective properties to light. Other variable physical characteristics may be chosen to distinguish each symbol, for example the color, the reflectivity, the opacity, the light absorption level, the magnetic field, the induced magnetic field, the resistivity, the capacity, etc.

The code may comprise error-detecting or error-correcting information, in particular related to data. Information for detecting errors may comprise repetition codes, parity bits, checksums, cyclic redundancy checks, cryptographic hash function data, etc. Information for correcting errors may comprise error-correcting codes, forward error correction codes, and in particular, convolutional codes or block codes.

The at least one first data sequence of symbols and the at least one second data sequence of symbols may comprise the same information. Hence, error-checking may be performed by comparison for example, and parts of the code affected by errors may be processed accordingly. Hence, it improves the probability of a successful reading of the code, should some parts of the sequence be unreadable.

In an embodiment, the first preamble sequence of symbols is formed by a plurality of first preamble sub-sequences, said plurality of first preamble sub-sequences being distributed according to a first pattern among the first sequence. The second preamble sequence of symbols is formed by a plurality of second preamble sub-sequences, said plurality of second preamble sub-sequences being distributed according to a second pattern among the second sequence. In particular, the first pattern and the second pattern may be identical.

For instance, a first preamble sequence $P_A$ is formed by four first preamble sub-sequences: $P_{A1}$='10', $P_{A2}$='01', $P_{A3}$='10', $P_{A4}$='01'. A first block D1 comprises 4 first sub-blocks $D_{11}$, $D_{12}$, $D_{13}$, $D_{14}$, forming a data block F1 having n1 bits with parity check bits. The first sequence may be as follows: $P_{A1}$ $D_{11} P_{A2} D_{12} P_{A3} D_{13} P_{A4} D_{14}$. A second preamble sequence $P_B$ is formed by four second preamble sub-sequences: $P_{A1}$='01', $P_{A2}$='10', $P_{A3}$='01', $P_{A4}$='10'. A first block D2 comprises 4 first sub-blocks $D_{21}$, $D_{22}$, $D_{23}$, $D_{24}$, forming a data block F2 having n2 bits with parity check bits. The second sequence may be as follows: $P_{B1} D_{21} P_{B2} D_{22} P_{B3} D_{23} P_{B4} D_{24}$. The position of the first sequence and the second sequence may be then determined by using an algorithm for identifying the pattern $P_{A1}$-X-$P_{A2}$-X-$P_{A3}$-X-$P_{A4}$-$P_{B1}$-X-$P_{B2}$-X-$P_{B3}$-X-$P_{B4}$ where X stands for any sequence of bits. For example, a Number of Equal Bits (NEB) filter can be used.

Advantageously, the first preamble sequence of symbols and the second preamble sequence of symbols may be chosen/set to minimize the number of equal bits in series in the code.

The code comprises preferably at least 100 symbols.

The code may be arranged along at least a eighth of the circumference, and preferably along the entire circumference of the support.

According to a second aspect, the invention relates to a capsule indented for delivering a beverage in a beverage producing device by centrifugation comprising a flange-like rim comprising a code support according to the first aspect.

According to a third aspect, the invention relates to a system for preparing a beverage from a capsule according to the second aspect, and further comprising a beverage preparation device having capsule holding means for holding the capsule and rotational drive means for driving the holding means and capsule in rotation along said axis of rotation. The beverage preparation devices further comprises a reading arrangement configured for decoding the code represented on the code support:

by reading separately each symbol of the code, while driving the rotational drive means so as to the capsule performs at least one complete revolution; and, by searching, in the read symbols, the at least one first preamble sequence and the second preamble sequence;

by identifying the position of the at least one first sequence and the at least one second sequence, accordingly.

According to a fourth aspect, the invention relates to a method reading a code on a capsule according to the second aspect, in a beverage preparation device comprising capsule holding means for holding the capsule and rotational drive means for driving the holding means and capsule in rotation along said axis of rotation; the beverage preparation devices further comprising a reading arrangement. The method comprises the following step:

reading separately, with the reading arrangement, each symbol of the code, while driving the rotational drive means so as to the capsule performs at least one complete revolution; and, searching, in the read symbols, the at least one first preamble sequence and the second preamble sequence;

identifying the position of the at least one first sequence and the at least one second sequence, accordingly.

BRIEF DESCRIPTION OF THE FIGURES

The present invention will be better understood thanks to the detailed description which follows and the accompanying drawings, which are given as non-limiting examples of embodiments of the invention, namely.

DETAILED DESCRIPTION

Figure 1:
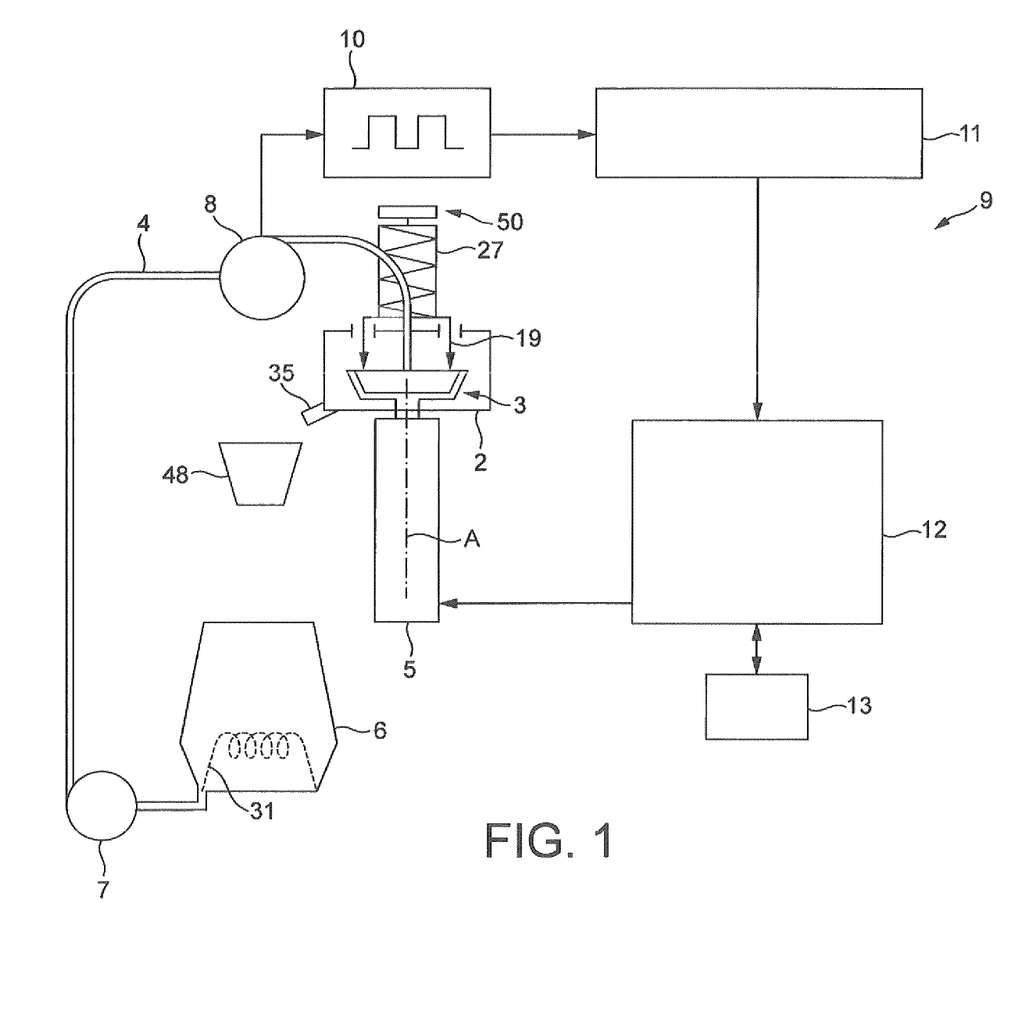
FIG. 1 illustrates the basic principle of the centrifugal extraction.

FIG. 1 illustrates an example of a beverage preparation system 1 as described in WO2010/026053 for which the capsule of the invention can be used.

The centrifugal unit 2 comprises a centrifugal cell 3 for exerting centrifugal forces on the beverage ingredient and liquid inside the capsule. The cell 3 may comprise a capsule holder and a capsule received therein. The centrifugal unit is connected to driving means 5 such as a rotary motor. The centrifugal unit comprises a collecting part and an outlet 35. A receptacle 48 can be disposed below the outlet to collect the extracted beverage. The system further comprises liquid supply means such as a water reservoir 6 and a fluid circuit 4. Heating means 31 may also be provided in the reservoir or along the fluid circuit. The liquid supply means may further comprise a pump 7 connected to the reservoir. A flow restriction means 19 is provided to create a restriction to the flow of the centrifuged liquid which leaves the capsule. The system may further comprise a flow meter such as a flow-metering turbine 8 for providing a control of the flow rate of water supplied in the cell 3. The counter 11 can be connected to the flow-metering turbine 8 to enable an analysis of the generated impulse data 10. The analysed data is then transferred to the processor 12. Accordingly, the exact actual flow rate of the liquid within the fluid circuit 4 can be calculated in real-time. A user interface 13 may be provided to allow the user to input information that is transmitted to the control unit 9. Further characteristics of the system can be found in WO2010/026053.

Figure 3A:
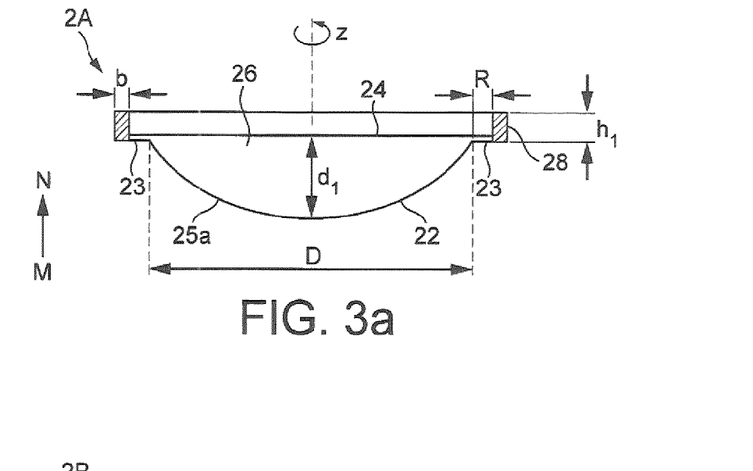
FIG. 3a, 3b, 3c illustrate an embodiment of a set of capsules according to the invention.
Figure 3B:
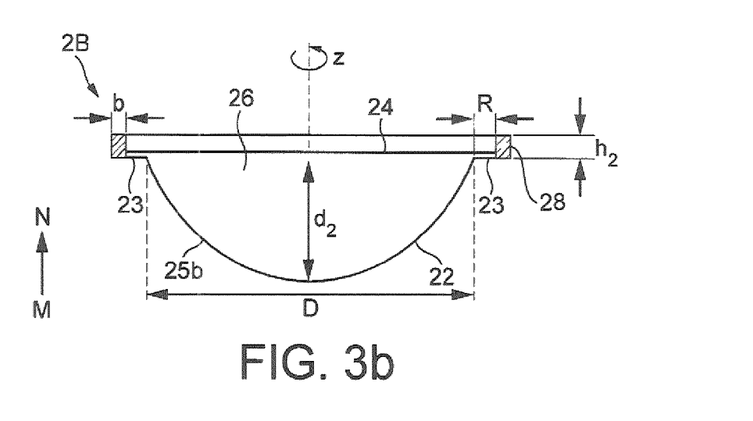
Figure 3C:
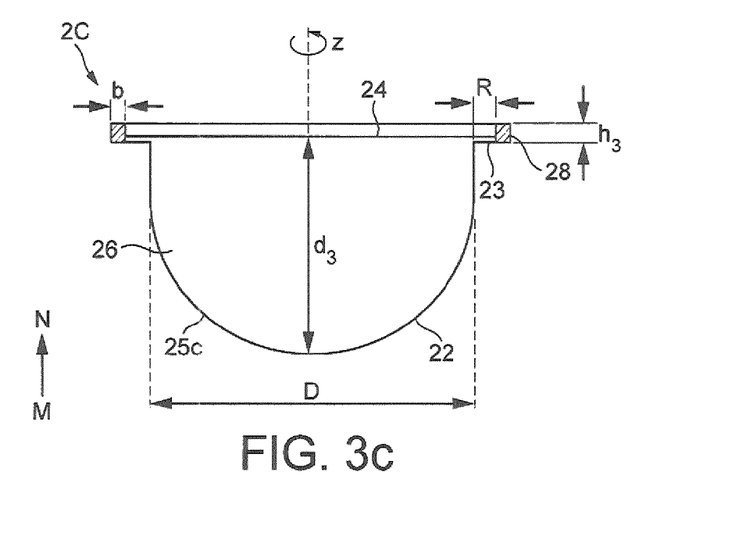

FIGS. 3a, 3b and 3c relate to an embodiment of a set of capsules 2A, 2B, 2C. The capsules preferably comprise a body 22, a rim 23 and an upper wall member respectively a lid 24. The lid 24 may be a perforable membrane or an aperture wall. Thereby the lid 24 and the body 22 enclose an enclosure respectively ingredients compartment 26. As shown in the figures, the lid 24 is preferably connected onto an inner annular portion R of the rim 23 that is preferably between 1 to 5 mm.

The rim is not necessarily horizontal as illustrated. It can be slightly bended. The rim 23 of the capsules preferably extends outwardly in a direction essentially perpendicular (as illustrated) or slightly inclined (if bended as aforementioned) relative to the axis of rotation Z of the capsule. Thereby, the axis of rotation Z represents the axis of rotation during centrifugation of the capsule in the brewing device, and in particular is sensibly identical to the axis of rotation Z of the capsule holder 32 during centrifugation of the capsule in the brewing device.

It should be understood that the shown embodiment is just an exemplary embodiment and that the capsules in particular the capsule body 22 can take various different embodiments.

The body 22 of the respective capsule has a single convex portion 25a, 25b, 25c of variable depth, respectively, d1, d2, d3. Thereby, the portion 25a, 25b, 25c may as well be a truncated or a partially cylindrical portion.

Hence, the capsules 2A, 2B, 2C preferably comprise different volumes but, preferably, a same insertion diameter 'D'. The capsule of FIG. 3a shows a small volume capsule 2A whereas the capsule of FIGS. 3b and 3c show a larger volume capsule 2B respectively 2C. The insertion diameter 'D' is hereby determined at the line of intersection between the lower surface of the rim 23 and the upper portion of the body 22. However, it could be another referencing diameter of the capsule in the device.

The small volume capsule 2A preferably contains an amount of extraction ingredient, e.g., ground coffee, smaller than the amount for the large volume capsules 2B, 2C. Hence, the small capsule 2A is intended for delivery of a short coffee of between 10 ml and 60 ml with an amount of ground coffee comprised between 4 and 8 grams. The larger capsules 2B is intended for delivery of a medium-size coffee, e.g., between 60 and 120 ml and the largest capsule is intended for delivery of a long-size coffee, e.g., between 120 and 500 ml. Furthermore, the medium-size coffee capsule 2B can contain an amount of ground coffee comprised between 6 and 15 grams and the long-size coffee capsule 2C can contain an amount of ground coffee between 8 and 30 grams.

In addition, the capsules in the set according to the invention may contain different blends of roast and ground coffee or coffees of different origins and/or having different roasting and/or grinding characteristics.

The capsule is designed for rotating around the axis Z. This axis Z crosses perpendicularly the center of the lid which has the form of a disk. This axis Z exits at the center of the bottom of the body. This axis Z will help to define the notion of "circumference" which is a circular path located on the capsule and having the axis Z as reference axis. This circumference can be on the lid, e.g. lid or on the body part such as on the flange-like rim. The lid may be impervious to liquid before insertion in the device or it may be pervious to liquid by means of small openings or pores provided in the center and/or periphery of the lid.

Hereafter, the lower surface of the rim 23 refers to the section of the rim 23 that is located outside the enclosure formed by the body and the lid, and is visible when the capsule is oriented on the side where its body is visible.

Further characteristics of the capsules or the set capsules can be found in documents WO 2011/0069830, WO 2010/0066705, or WO2011/0092301.

Figure 2A:
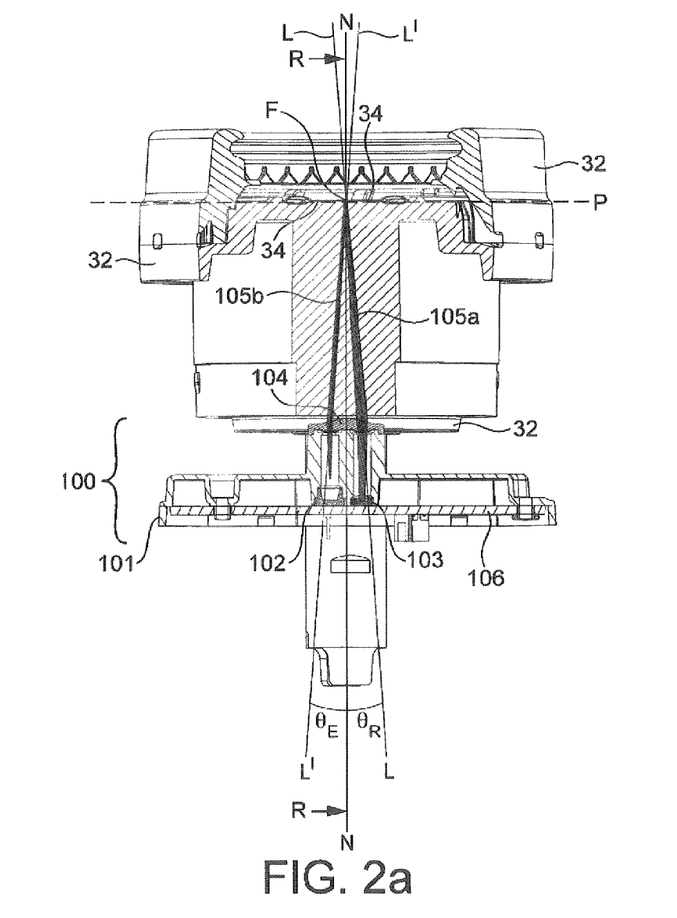
FIG. 2a, 2b illustrate an embodiment of the centrifugal cell with a capsule holder.
Figure 2B:
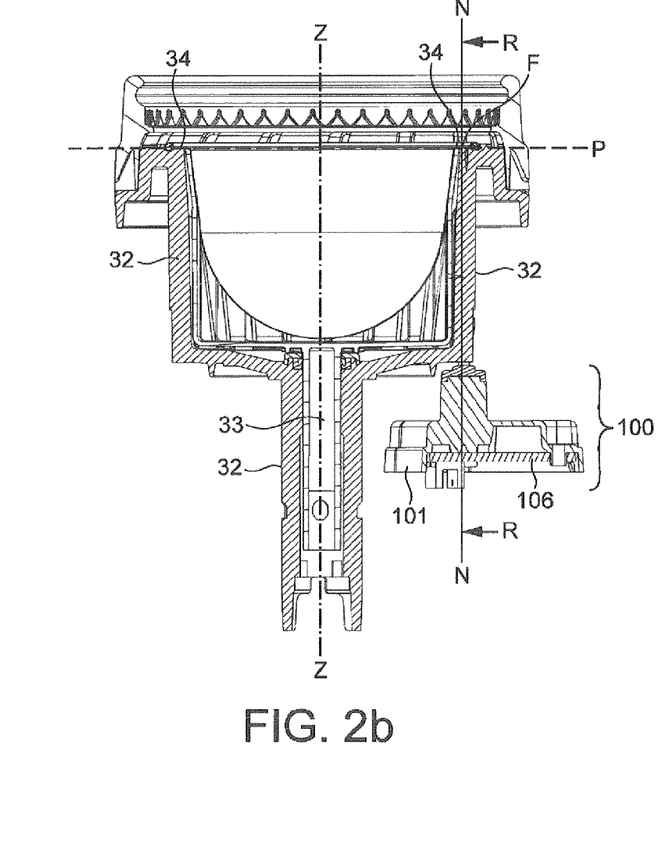

An embodiment of the centrifugal cell 3 with a capsule holder 32 is illustrated by FIGS. 2a and 2b. The capsule holder 32 forms in general a cylindrical or conical wide shaped cavity provided with an upper opening for inserting the capsule and a lower bottom closing the receptacle. The opening has a diameter slightly larger than the one of the body 22 of the capsule. The outline of the opening fits to the outline of the rim 23 of the capsule configured to lean on the edge of the opening when the capsule is inserted. As a consequence, the rim 23 of the capsule rests at least partially on a receiving part 34 of the capsule holder 32. The lower bottom is provided with a cylindrical shaft 33 attached perpendicularly to the center of the external face of the bottom. The capsule holder 32 rotates around the central axis Z of the shaft 33.

An optical reading arrangement 100 is also represented in FIGS. 2a and 2b. The optical reading arrangement 100 is configured to deliver an output signal comprising information related to a level of reflectivity of a surface of the lower surface of the rim 23 of a capsule leaning on the receiving part 34 of the capsule holder 32. The optical reading arrangement is configured to perform optical measurements of the surface of the lower surface of the rim 23 through the capsule holder 32, more particularly through a lateral wall of the cylindrical or conical wide shaped capsule holder 32. Alternatively, the output signal may contain differential information, for instance differences of reflectivity over time, or contrast information. The output signal may be analog, for example a voltage signal varying with the information measured over the time. The output signal may be digital, for example a binary signal comprising numerical data of the information measured over the time.

In the embodiment of FIGS. 2a and 2b, the reading arrangement 100 comprises a light emitter 103 for emitting a source light beam 105a and a light receiver 102 for receiving a reflected light beam 105b.

Typically the light emitter 103 is a light-emitting diode or a laser diode, emitting an infrared light, and more particularly a light with a wavelength of 850 nm. Typically, the light receiver 103 is a photodiode, adapted to convert a received light beam into a current or voltage signal.

The reading arrangement 100 comprises also processing means 106 including a printed circuit board embedding a processor, sensor signal amplifier, signal filters and circuitry for coupling said processing means 106 to the light emitter 103, the light receiver 102 and to the control unit 9 of the machine.

The light emitter 103, the light receiver 102, and the processing means 106 are maintained in a fixed position by a support 101, rigidly fixed relatively to the machine frame. The reading arrangement 100 stays into its position during an extraction process and is not driven into rotation, contrary to the capsule holder 32.

In particular, the light emitter 103 is disposed so as the source light beam 105a is generally oriented along a line L crossing at a fixed point F the plane P comprising the receiving part 34 of the capsule holder 32, said plane P having a normal line N passing through the point F. The fixed point F determines an absolute position in space where the source light beams 105a is intended to hit a reflective surface: the position of the fixed point F remains unchanged when the capsule holder is rotated. The reading arrangement may comprise focusing means 104, using for example holes, lenses and/or prisms, to make the source light beam 105 converging more efficiently to the fixed point F of the lower surface of the lid of a capsule positioned into the capsule holder 32. In particular, the source light beam 105 may be focused so as to illuminate a disc centered sensibly on the fixed point F and having a diameter d.

The reading arrangement 100 is configured so as the angle $\theta_E$ between the line L and the normal line N is comprised between 2° and 10°, and in particular between 4° and 5° as shown in FIG. 2a. As a consequence, when a reflecting surface is disposed at the point F, the reflected light beam 105b is generally oriented along a line L', crossing the fixed point F, the angle $\theta_R$ between the line L' and the normal line N being comprised between 2° and 10°, and in particular between 4° and 5° as shown in FIG. 2a. The light receiver 102 is disposed on the support 101 so as to gather at least partially the reflected light beam 105b, generally oriented along the line L'. The focusing means 104 may also be arranged to make the reflected light beam 105b concentrating more efficiently to the receiver 102. In the embodiment illustrated in FIG. 2a, 2b, the point F, the line L and the line L' are co-planar. In another embodiment, the point F, the line L and the line L' are not co-planar: for instance, the plane passing through the point F and the line F and the plane passing through the point F and the line L' are positioned at an angle of sensibly 90°, eliminating direct reflection and allowing a more robust reading system with less noise.

The capsule holder 32 is adapted to allow the partial transmission of the source light beam 105a along the line L up to the point F. For instance, the lateral wall forming the cylindrical or conical wide shaped cavity of the capsule holder is configured to be non-opaque to infra-red lights. Said lateral wall can be made of a plastic based material which is translucent to infra-red having entry surfaces allowing infra-red light to enter.

As a consequence, when a capsule is positioned in the capsule holder 32, the light beam 105a hits the bottom part of the rim of said capsule at point F, before forming the reflected light beam 105b. In this embodiment, the reflected light beam 105b passes through the wall of the capsule holder up to the receiver 102.

The section of the lower surface of the rim 23 of a capsule positioned into the capsule holder 32, illuminated at the point F by the source light beam 105, changes over the time, only when the capsule holder 32 is driven into rotation. So, a complete revolution of the capsule holder 32 is required for the source light beam 105 to illuminate the entire annular section of the lower surface of the rim.

The output signal may be computed or generated by measuring over the time the intensity of the reflected light beam, and possibly, by comparing its intensity to those of the source light beam. The output signal may be computed or generated by determining the variation over the time of the intensity of the reflected light beam.

The capsule according to the invention comprises at least one optically readable code support. The code support can be in the present part of the flange-like rim. Symbols 64 are represented on the optical code support.

The symbols 64 arranged in at least one sequence, said sequence coding a set of information related to the capsule. Each of the symbols 64 is used to encode a specific value.

In particular, the set of information of at least one of the sequences may comprise information for recognizing a type associated to the capsule, and/or one or a combination of items of the following list:
 information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc;
 information for retrieving locally and/or remotely parameters for preparing a beverage with the capsule, for example an identifier allowing the recognition of a type for the capsule;
 information related to the manufacturing of the capsule, such a production batch identifier, a date of production, a recommended date of consumption, an expiration date, etc;
 information for retrieving locally and/or remotely information related to the manufacturing of the capsule.

The symbols 64 are distributed sensibly on at least ⅛th of the circumference of the annular support, preferably, on the entire circumference of the annular support. The code may comprise successive arch-shaped segments. The symbols 64 may also comprise successive segments which are individually rectilinear but extend along at least a part of the circumference.

Figure 4:
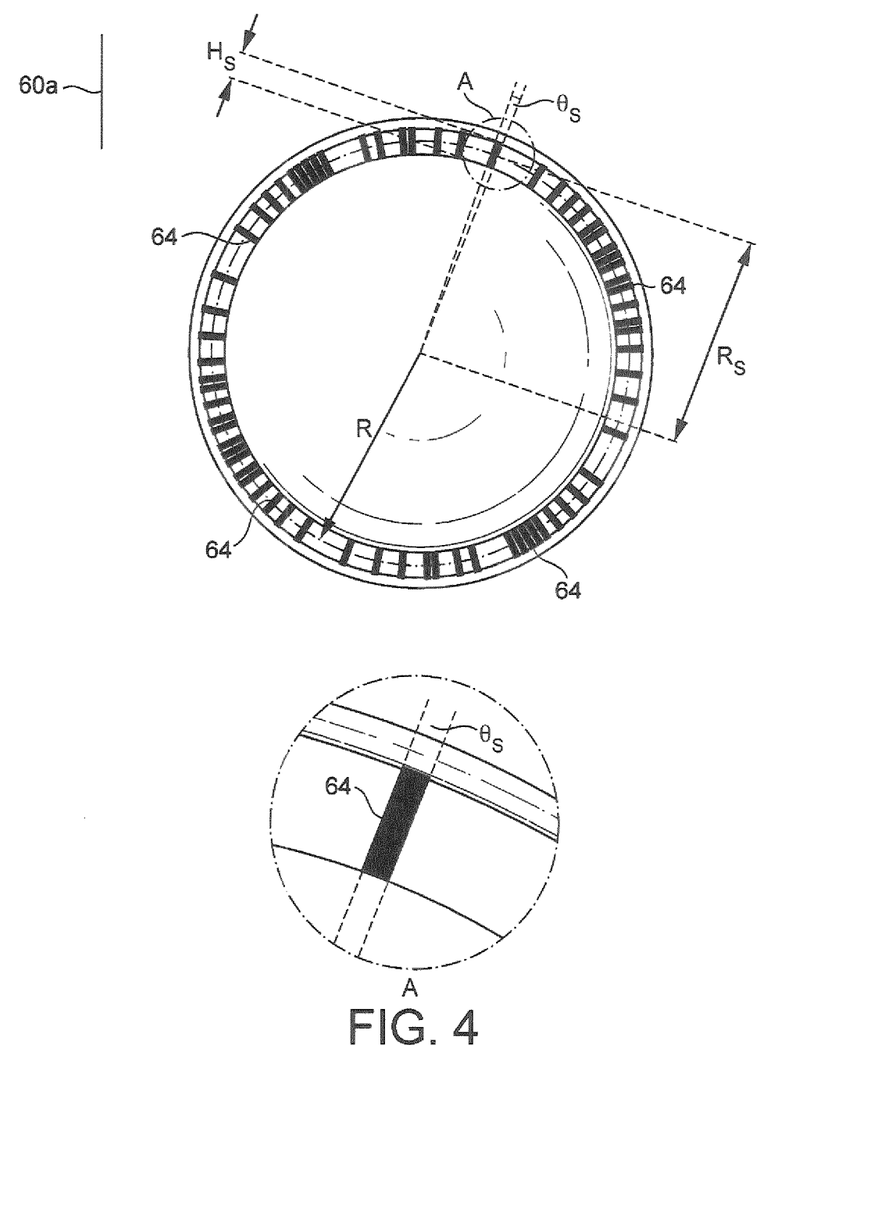
FIG. 4 illustrates an embodiment of a code support according to the invention.

Referring to FIG. 4, an embodiment 60a of a code support is illustrated. The code support 60a occupies a defined width $H_s$ of the rim 23 of the capsule. The rim 23 of the capsule can comprise essentially an inner annular portion forming the support 60a and an outer (non-coded) curled portion. However, it can be that the full width of the rim is occupied by the support 60a, in particular, if the lower surface of the rim can be made substantially flat. This location is particularly advantageous since they offer both a large area for the symbols 64 to be disposed and is less prone to damages caused by the processing module and in particular by the pyramidal plate, and to ingredients projections. As a consequence, the amount of coded information and the reliability of the readings are both improved. In this embodiment, the code support 60a comprises 160 of the symbols 64, and each symbol 64 codes 1 bit of information. The symbols 64 being contiguous, and each symbol 64 has an arc-linear length $\theta_s$ of 2.25° and may be arranged along a circle having a radius $R_s$.

Figure 5:
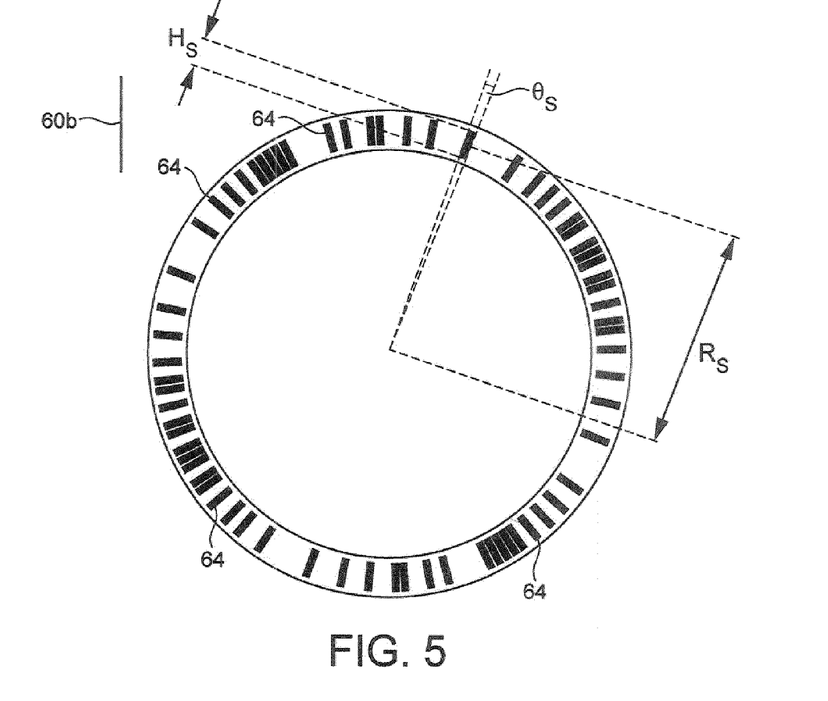
FIG. 5 illustrates an alternate position of the sequence on the capsule, in particular, when placed on the underside of the rim of the capsule, and the capsule fitted into a capsule holder of the extraction device, FIG. 6 illustrate a graphical representation of an example of the results of a NEB filter on a code with a common preamble used by all the sequence of the code.

Referring to FIG. 5, an embodiment 60b of a code support is illustrated in planar view. The code support 60b is adapted to be associated with or be part of a capsule, so as to be driven in rotation when the capsule is rotated around its axis Z by the centrifugal unit 2. The receiving section of the capsule is the lower surface of the rim 23 of the capsule. As illustrated on FIG. 5, the code support may be a ring having a circumferential part on which the at least one sequence of the symbols 64 is represented, so as the user can position it on the circumference of the capsule before introducing it into the brewing unit of the beverage machine. Consequently, a capsule without embedded means for storing information can be modified by mounting such a support so as to add such information. When the support is a separate part, it may be simply added on the capsule without additional fixing means, the user ensuring that the support is correctly positioned when entering the brewing unit, or the forms and the dimensions of the support preventing it from moving relatively to the capsule once mounted. The code support 60b may also comprise additional fixing means for rigidly fixing said element to the receiving section of the capsule, like glue or mechanical means, to help the support staying fixed relatively to the capsule once mounted. As also mentioned, the code support 60b may also be a part of the rim itself such as integrated to the structure of the capsule.

Each symbol 64 is adapted to be measured by the reading arrangement 100 when the capsule is positioned into the capsule holder and when said symbol is aligned with the source light beam 105a at point F. More particularly, each different symbol 64 presents a level of reflectivity of the source light beam 105a varying with the value of said symbol. Each symbol 64 has different reflective and/or absorbing properties of the source light beam 105a.

Since the reading arrangement 100 is adapted to measure only the characteristics of the illuminated section of the coding support, the capsule has to be rotated by the driving means until the source light beam has illuminated all the symbols 64 comprised in the code. Typically, the speed for reading the code can be comprised between 0.1 and 2000 rpm.

EXAMPLE 1

Unsuitable Code Preamble for Optical Code Support Having at Least Two Sequences, Read in Rotation An example of a sequence of 15 binary symbols is shown in the following table 1:

TABLE 1

| S1 | | | |
|---|---|---|---|
| P1 | F11 | F12 | F13 |
| 1  0  1  0  1  0 | 0  0  1  0 | 0  1  0 | 1  0 |

The sequence S1 of table 1 begins with a 6-bits long preamble. The preamble P1 corresponds to a known reserved sequence of bits, in this example '101010'. Then, the sequence comprises three blocks F11, F12, F13 of data. Each block of data begins with a 2-bits long value, and ends with an odd parity check bit. In table 2, an example of a reading of a code comprising the sequence S1 followed by a sequence S2, is shown:

TABLE 2

| S1 | | | | S2 | | | | S1 |
|---|---|---|---|---|---|---|---|---|
| P1 | F11 | F12 | F13 | P1 | F11 | F12 | F13 | P1 |
| X  X  1  0  1  0 | 0  0  1  0 | 0  1  0 | 1  0 | 1  0  1  0  1  0 | 0  0  1  0 | 0  1  0 | 1  0 | 1 0 |

The reading starts at the third bits of the first sequence S1, after the beginning of the preamble P1. To read all the symbols of every sequence, at least one complete rotation of the optical code support is then needed.

Having gathered all the symbols, it is necessary to rebuild each sequence, and in particular by determining the position of the preambles. A matched filtering method can be used to perform this task. For instance, in the following example, a Number of Equal Bits (NEB) filter has been applied to the read bits, using the preamble P1 as matching pattern '101010'. This filtering method consists in summing, for each window of consecutive bits of the read bits, said window having the same length as the matching pattern, the number of bits that are in common with the bits of the matching pattern. For a six bits long preamble P1, the maximum of the NEB filter is 6, when the read bits of the window matched those of the preamble P1. The result can be further improved by calculating a contrast between the results of the NEB filter, for instance, by calculating the difference between the result of the NEB filter at a given position of the window, and the result of the NEB filter at the following position of the window. The higher the contrast, the better.

TABLE 3

| | S1 | | | | | | | | | | | | | | | | S2 | | | | | | | | | | | | | |
|---|---|---|---|---|---|---|---|---|---|---|---|---|---|---|---|---|---|---|---|---|---|---|---|---|---|---|---|---|---|---|
| | P1 | | | | | | F11 | | | F12 | | | F13 | | | | P1 | | | | | | F11 | | | F12 | | | F13 | | |
| | X | X | 1 | 0 | 1 | 0 | 0 | 0 | 1 | 0 | 0 | 1 | 0 | 1 | 0 | 1 | 0 | 1 | 0 | 1 | 0 | 0 | 0 | 1 | 0 | 0 | 1 | 0 | 1 | 0 |

Matched filter

| NEB | | | | | | | | | | | | | | | Window | | | | | | | | | | | | | | | |
|---|---|---|---|---|---|---|---|---|---|---|---|---|---|---|---|---|---|---|---|---|---|---|---|---|---|---|---|---|---|---|
| 5 | 1 | 0 | 1 | 0 | 1 | 0 | X | X | X | X | X | X | X | X | X | X | X | X | X | X | X | X | X | X | X | X | X | X | X | X |
| 1 | X | 0 | 1 | 0 | 0 | 0 | 1 | X | X | X | X | X | X | X | X | X | X | X | X | X | X | X | X | X | X | X | X | X | X | X |
| 5 | X | X | 1 | 0 | 1 | 0 | 1 | 0 | X | X | X | X | X | X | X | X | X | X | X | X | X | X | X | X | X | X | X | X | X | X |
| 2 | X | X | X | 0 | 0 | 0 | 1 | 0 | 0 | X | X | X | X | X | X | X | X | X | X | X | X | X | X | X | X | X | X | X | X | X |
| 3 | X | X | X | X | 1 | 0 | 1 | 0 | 0 | 1 | X | X | X | X | X | X | X | X | X | X | X | X | X | X | X | X | X | X | X | X |
| 3 | X | X | X | X | X | 0 | 1 | 0 | 0 | 1 | 0 | X | X | X | X | X | X | X | X | X | X | X | X | X | X | X | X | X | X | X |
| 2 | X | X | X | X | X | X | 1 | 0 | 0 | 1 | 0 | 1 | X | X | X | X | X | X | X | X | X | X | X | X | X | X | X | X | X | X |
| 5 | X | X | X | X | X | X | X | 0 | 0 | 1 | 0 | 1 | 0 | X | X | X | X | X | X | X | X | X | X | X | X | X | X | X | X | X |
| 0 | X | X | X | X | X | X | X | X | 0 | 1 | 0 | 1 | 0 | 1 | X | X | X | X | X | X | X | X | X | X | X | X | X | X | X | X |
| 6 | X | X | X | X | X | X | X | X | X | 1 | 0 | 1 | 0 | 1 | 0 | X | X | X | X | X | X | X | X | X | X | X | X | X | X | X |
| 0 | X | X | X | X | X | X | X | X | X | X | 0 | 1 | 0 | 1 | 0 | 1 | X | X | X | X | X | X | X | X | X | X | X | X | X | X |
| 6 | X | X | X | X | X | X | X | X | X | X | X | 1 | 0 | 1 | 0 | 1 | 0 | X | X | X | X | X | X | X | X | X | X | X | X | X |
| 0 | X | X | X | X | X | X | X | X | X | X | X | X | 0 | 1 | 0 | 1 | 0 | 1 | X | X | X | X | X | X | X | X | X | X | X | X |
| 6 | X | X | X | X | X | X | X | X | X | X | X | X | X | 1 | 0 | 1 | 0 | 1 | 0 | X | X | X | X | X | X | X | X | X | X | X |
| 1 | X | X | X | X | X | X | X | X | X | X | X | X | X | X | 0 | 1 | 0 | 1 | 0 | 0 | X | X | X | X | X | X | X | X | X | X |
| 5 | X | X | X | X | X | X | X | X | X | X | X | X | X | X | X | 1 | 0 | 1 | 0 | 0 | 1 | X | X | X | X | X | X | X | X | X |

Figure 6:
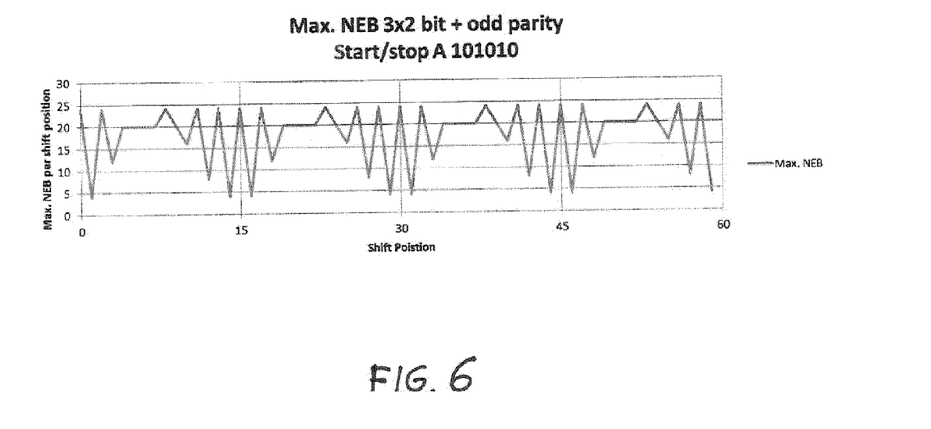

In this non-working example, the maximum 6 for the NEB filter is found for 6 bits sequences starting at bit 10, bit 12 and bit 14. However, only the 6 bits sequence starting at bit 14 corresponds actually at the preamble P1 of the second period. Even a contrast calculation does not allow solving this problem, since the contrast is higher for the 6 bits sequences starting at bit 10 and bit 12. As a consequence, such preamble P1 is not suitable, in particular since it does not allow determining with confidence the effective position of said preamble, in the sequences. The FIG. 6 shows an example of the results of a NEB filter on such a code structure.

EXAMPLE 2

Code Preamble for Optical Code Support Having Four Sequences, Read In Rotation

A suitable preamble P is shown hereafter. The preamble P is spread over the sequences represented on the optical code support. For instance, the preamble P comprises a first 6-bits long sequence $P_A$='101010', a second 6-bits long sequence $P_B$='010101', a third 6-bits long sequence $P_C$='011001', and a fourth third 6-bits long sequence $P_D$='100110'.

A first sequence S1 begins with the first sequence $P_A$, then, a first block D1 comprising three data block F11, F12, F13 with parity check bits. The second sequence S2 begins with the second sequence $P_B$, then, a second block D2 comprising three data block F21, F22, F23 with parity check bits. The third sequence S3 begins with the third sequence $P_C$, then, a third block D3 comprising the three data blocks F11, F12, F13 with parity check bits. The fourth sequence S4 begins with the fourth sequence $P_D$, then, a fourth block D4 comprising the three data blocks F21, F22, F23 with their parity check bit. Then on the code support are represented the following sequences: $P_A$-F11-F12-F13-$P_B$-F21-F22-F23-$P_C$-F11 -F12-F13-$P_D$-F21-F22-F23. The first block D1, respectively the second block D2, the third block D3, the fourth D4 comprise a number n1, respectively n2, n3 and n4, of bits.

To read all the symbols of every sequence, at least one complete rotation of the optical code support is then needed.

The position of the first block D1, the second block D2, the third block D3, and the fourth block D4 are determined by looking for the pattern $P_A$-X1-$P_B$-X2-$P_C$-X3-$P_D$-X4 in the sequence of bits read by the optical reader, where X1 stands for any sequence of n1 bits, X2 stands for any sequence of n2 bits, X3 stands for any sequence of n3 bits, X4 stands for any sequence of n4 bits. Hence, not only the sequence of bits corresponding to those of the preamble are searched, but the relative positions of $P_A$, $P_B$, $P_C$, $P_D$ are taken into consideration, allowing a more robust and reliable identification of the start of each data blocks.

For example, a Number of Equal Bits (NEB) filter can be applied to the read bits, using the following matching pattern:
'101010xxxxxxxxx010101xxxxxxxxx011001xxxxxxxxx 100110xxxxxxxxx',
where x corresponds to any bit, and with n1=n2=n3=n4=9 bits.

Figure 7:
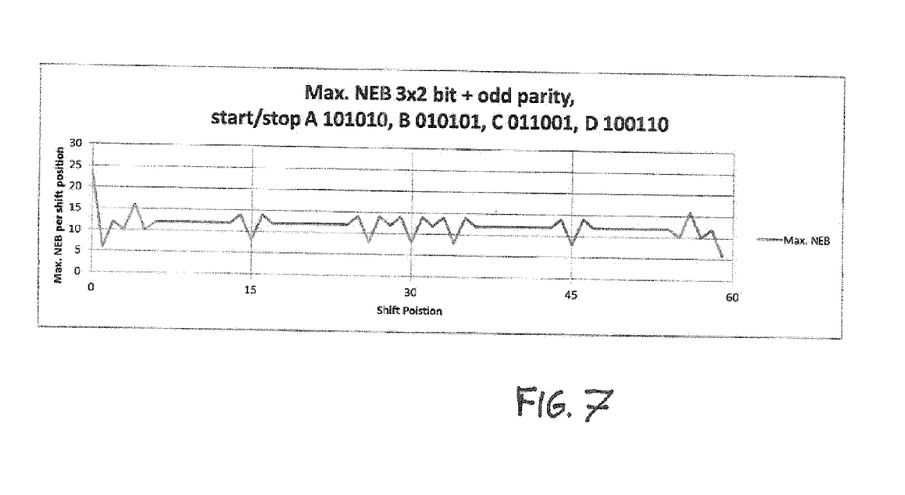
FIG. 7 illustrate a graphical representation of an example of the results of a NEB filter on a code according to an embodiment of the invention.

The filter is applied to read bits, shifting the start position of the rolling filtering window from the first bit read to the last bit read. The position of the window corresponding to the maximum value of the NEB filter is likely to correspond to the start of the first sequence S1. The FIG. 7 shows an example of the results of a NEB filter on such a code structure.

It is also possible to calculate the contrast between the value of the NEB filter for each position of the window relatively to the value of the NEB filter at the following position of the window: the position of the window corresponding to the maximum value of the NEB contrast is then likely to correspond to the start of the first sequence S1.

EXAMPLE 3

Code Preamble for Optical Code Support Having Four Sequences, Read in Rotation

A suitable preamble P' is shown hereafter. The preamble P' is spread over the sequences represented on the optical code support. For instance, the preamble P' comprises a first 6-bits long sequence $P_A$='101010', a second 6-bits long sequence $P_B$='010101', a third 6-bits long sequence $P_C$='011001', and a fourth third 6-bits long sequence $P_D$='100110'.

The first sequence $P_A$ comprises three sub-sequence $P_{A1}$='10', $P_{A2}$='10', $P_{A3}$='10'. The second sequence $P_B$ comprises three sub-sequence $P_{B1}$='01', $P_{B2}$='01', $P_{B3}$='01'. The third sequence $P_C$ comprises three sub-sequence $P_{C1}$='01', $P_{C2}$='10', $P_{C3}$='01'. The fourth sequence $P_D$ comprises three sub-sequence $P_D1$='10', $P_D2$='01', $P_D3$='10'.

A first sequence S1 is formed by the sub-sequence $P_{A1}$ then, a data block F1 with a parity check bit, the sub-sequence $P_{A2}$, then, a data block F2 with a parity check bit, the sub-sequence $P_{A3}$, then a data block F3 with a parity check bit. A second sequence S2 is formed by the sub-sequence $P_{B1}$, then, the data block F1 with a parity check bit, the sub-sequence $P_{B2}$, then, the data block F2 with a parity check bit, the sub-sequence $P_{B3}$, then data block F3 with a parity check bit. A third sequence S3 is formed by the sub-sequence $P_{C1}$, then, the data block F1 with a parity check bit, the sub-sequence $P_{C2}$, then, the data block F2 with a parity check bit, the sub-sequence $P_{C3}$, then data block F3 with a parity check bit. A fourth sequence S4 is formed by the sub-sequence $P_D1$, then, the data block F1 with a parity check bit, the sub-sequence $P_D2$, then, the data block F2 with a parity check bit, the sub-sequence $P_D3$, then data block F3 with a parity check bit. Then on the code support are represented the following sequences:

$P_{A1}$-F1-$P_{A2}$-F2-$P_{A3}$-F3-$P_{B1}$-F1-$P_{B2}$-F2-$P_{B3}$-F3-$P_{C1}$-F1-$P_{C2}$-F2-$P_{C3}$-F3-$P_{D1}$-F1-$P_{D2}$-F2-$P_{D3}$-F3

The data block F1, respectively the data block F2, the data block F3, the data D4 comprise a number n1, respectively n2, n3 and n4, of bits.

To read all the symbols of every sequence, at least one complete rotation of the optical code support is then needed.

The position of the data block F1, the second block F2, the third block F3 in each sequences S1, S2, S3, S4 are determined by looking for the pattern:

$P_{A1}$-X1-$P_{A2}$-X2-$P_{A3}$-X3-$P_{B1}$-X1-$P_{B2}$-X2-$P_{B3}$-X3-$P_{C1}$-X1-$P_{C2}$-X2-$P_{C3}$-X3-$P_{D1}$-X1-$P_{D2}$-X2-$P_{D3}$-X3 in the sequence of bits read by the optical reader, where X1 stands for any sequence of n1 bits, X2 stands for any sequence of n2 bits, X3 stands for any sequence of n3 bits.

Figure 8:
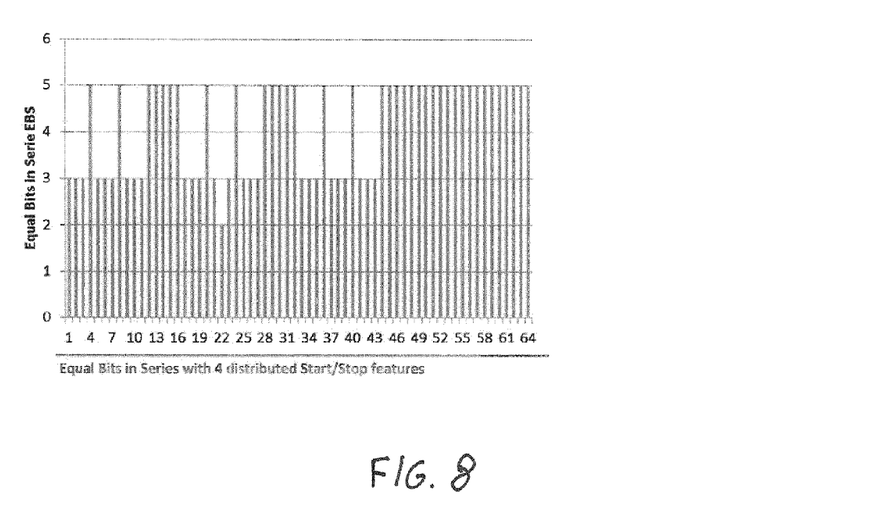
FIG. 8 shows a graphical representation of the number of equal bits in series for a code according to an embodiment of the invention.

Hence, not only the sequence of bits corresponding to those of the preamble are searched, but the relative positions of each sub-sequence of $P_A$, $P_B$, $P_C$, $P_D$ are taken into consideration, allowing a more robust and reliable identification of the start of each data blocks. Moreover, by splitting and spreading the preambles into smaller sub-sequences, it is possible to optimize the information coding by minimizing the number of equal bits in series (EBS). FIG. 8 shows the number of equal bits in series for such a code structure.

For example, a Number of Equal Bits (NEB) filter can be applied to the read bits, using the following matching pattern:
'10xxx10xxx10xxx01xxx01xxx01xxx10xxx01xxx10xxx01xxx10xxx',
where x corresponds to any bit, and with n1=n2=n3=3 bits.

The filter is applied to read bits, shifting the start position of the rolling filtering window from the first bit read to the last bit read. The position of the window corresponding to the maximum value of the NEB filter is likely to correspond to the start of the first sequence S1.

It is also possible to calculate the contrast between the value of the NEB filter for each position of the window relatively to the value of the NEB filter at the following position of the window: the position of the window corresponding to the maximum value of the NEB contrast is then likely to correspond to the start of the first sequence S1.

The invention claimed is:

1. A code support adapted to be associated with or part of a capsule intended for delivering a beverage in a beverage producing device by centrifugation of the capsule, the support comprising a code formed by at least a first sequence of symbols and a second sequence of symbols, the code being represented on the support so that each symbol is sequentially readable by a reading arrangement of an external reading device while the capsule is rotated along an axis of rotation:
   the first sequence comprising at least one first preamble sequence of symbols and at least one first data sequence of symbols;
   the second sequence comprising at least one second preamble sequence of symbols and at least one second data sequence of symbols; and
   the first preamble sequence being distinct from the second preamble sequence.

2. The code support according to claim 1, wherein the code comprises error-detecting or error-correcting information.

3. The code support according to claim 1, wherein the first preamble sequence of symbols is formed by a plurality of first preamble sub-sequences, the plurality of first preamble sub-sequences being distributed according to a first pattern among the first sequence, and wherein the second preamble sequence of symbols is formed by a plurality of second preamble sub-sequences, the plurality of second preamble sub-sequences being distributed according to a second pattern among the second sequence.

4. The code support according to claim 1, wherein the code comprises at least 100 symbols.

5. The code support according to claim 1, wherein the code is arranged along at least an eighth of a circumference of the capsule.

6. The code support according to claim 1, wherein the code is arranged along an entire circumference of the capsule.

7. A code support adapted to be associated with or part of a capsule intended for delivering a beverage in a beverage producing device by centrifugation of the capsule, the support comprising a code formed by at least a first sequence of symbols and a second sequence of symbols, the code being represented on the support so that each symbol is sequentially readable by a reading arrangement of an external reading device while the capsule is rotated along an axis of rotation:
   the first sequence comprising at least one first preamble sequence of symbols and at least one first data sequence of symbols;
   the second sequence comprising at least one second preamble sequence of symbols and at least one second data sequence of symbols, wherein the at least one first data sequence of symbols and the at least one second data sequence of symbols comprise the same information, and the first preamble sequence being distinct from the second preamble sequence.

8. A code support adapted to be associated with or part of a capsule intended for delivering a beverage in a beverage producing device by centrifugation of the capsule, the support comprising a code formed by at least a first sequence of symbols and a second sequence of symbols, the code being represented on the support so that each symbol is sequentially readable by a reading arrangement of an external reading device while the capsule is rotated along an axis of rotation:
   the first sequence comprising at least one first preamble sequence of symbols and at least one first data sequence of symbols;
   the second sequence comprising at least one second preamble sequence of symbols and at least one second data sequence of symbols;
   the first preamble sequence being distinct from the second preamble sequence; and
   the first preamble sequence of symbols is formed by a plurality of first preamble sub-sequences, the plurality of first preamble sub-sequences being distributed according to a first pattern among the first sequence, and wherein the second preamble sequence of symbols is formed by a plurality of second preamble sub-sequences, the plurality of second preamble sub-sequences being distributed according to a second pattern among the second sequence, wherein the first pattern and the second pattern are identical.

9. A code support adapted to be associated with or part of a capsule intended for delivering a beverage in a beverage producing device by centrifugation of the capsule, the support comprising a code formed by at least a first sequence of symbols and a second sequence of symbols, the code being represented on the support so that each symbol is sequentially readable by a reading arrangement of an external reading device while the capsule is rotated along an axis of rotation:
the first sequence comprising at least one first preamble sequence of symbols and at least one first data sequence of symbols;
the second sequence comprising at least one second preamble sequence of symbols and at least one second data sequence of symbols, wherein the first preamble sequence of symbols and the second preamble sequence of symbols are set to minimize the number of equal bits in series in the code; and
the first preamble sequence being distinct from the second preamble sequence.

10. A capsule intended for delivering a beverage in a beverage producing device by centrifugation comprising a flange-like rim comprising a code support adapted to be associated with or part of the capsule comprising a support comprising a code formed by at least a first sequence of symbols and a second sequence of symbols, the code being represented on the support so that each symbol is sequentially readable by a reading arrangement of the device while the capsule rotates along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence.

11. The capsule according to claim 10, wherein the code comprises error-detecting or error-correcting information.

12. The capsule according to claim 10, wherein the first preamble sequence of symbols is formed by a plurality of first preamble sub-sequences, the plurality of first preamble sub-sequences being distributed according to a first pattern among the first sequence, and wherein the second preamble sequence of symbols is formed by a plurality of second preamble sub-sequences, the plurality of second preamble sub-sequences being distributed according to a second pattern among the second sequence.

13. The capsule of claim 10, comprising a body and a lid that encloses the body, the lid is connected onto an inner annular portion of the flange-like rim, and the code is arranged on an opposite side of the flange-like rim from the lid.

14. A capsule intended for delivering a beverage in a beverage producing device by centrifugation, the capsule comprising a flange-like rim comprising a code support adapted to be associated with or part of the capsule comprising a support comprising a code formed by at least a first sequence of symbols and a second sequence of symbols, the code being represented on the support so that each symbol is sequentially readable by a reading arrangement of the device while the capsule rotates along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence, wherein the at least one first data sequence of symbols and the at least one second data sequence of symbols comprise the same information.

15. A capsule intended for delivering a beverage in a beverage producing device by centrifugation, the capsule comprising a flange-like rim comprising a code support adapted to be associated with or part of the capsule comprising a support comprising a code formed by at least a first sequence of symbols and a second sequence of symbols, the code being represented on the support so that each symbol is sequentially readable by a reading arrangement of the device while the capsule rotates along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence, the first preamble sequence of symbols is formed by a plurality of first preamble sub-sequences, the plurality of first preamble sub-sequences being distributed according to a first pattern among the first sequence, and wherein the second preamble sequence of symbols is formed by a plurality of second preamble sub-sequences, the plurality of second preamble sub-sequences being distributed according to a second pattern among the second sequence, wherein the first pattern and the second pattern are identical.

16. A system for preparing a beverage, the system comprising:
a capsule comprising a support comprising a code formed by at least a first sequence of symbols and a second sequence of symbols, the code being represented on the support so that each symbol is sequentially readable by a reading arrangement of an external reading device while the capsule rotates along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence; and
a beverage preparation device configured to deliver the beverage from the capsule by centrifugation of the capsule, wherein the device comprises a capsule holder for holding the capsule and a rotational driver for driving the holder and the capsule in rotation along the axis of rotation, the beverage preparation device further comprising a reading arrangement configured for decoding the code represented on the code support:
by reading separately each symbol of the code, while driving the rotational driver so that the capsule performs at least one complete revolution;
by searching, in the read symbols, the at least one first preamble sequence and the second preamble sequence; and
by identifying the position of the at least one first sequence and the at least one second sequence, accordingly.

17. A method for reading a code on a capsule intended for delivering a beverage in a beverage producing device by centrifugation comprising a flange-like rim comprising a code support adapted to be associated with or part of the capsule intended for delivering the beverage, the support comprising a code formed by at least a first sequence of symbols and a second sequence of symbols, the code being represented on the support so that each symbol is sequentially readable by a reading arrangement of an external reading device while the capsule is driven in rotation along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence, in a beverage preparation device comprising a capsule holder for holding the capsule and rotational driver for driving the holder and capsule in rotation along the axis of rotation, the beverage preparation devices comprising a reading arrangement, the method comprises:

reading separately, with the reading arrangement, each symbol of the code, while driving the rotational driver so that the capsule performs at least one complete revolution;

searching, in the read symbols, the at least one first preamble sequence and the second preamble sequence; and identifying the position of the at least one first sequence and the at least one second sequence, accordingly.

18. A code support to be associated with or part of a capsule intended for delivering a beverage in a beverage producing device by centrifugation of the capsule, the support comprising a code formed by at least a first sequence of symbols, the code being represented on the support so that each symbol is sequentially readable by a reading arrangement of an external reading device while the capsule is driven in rotation about an axis of rotation:

the first sequence comprising at least one first data sequence formed by at least two subsequences of symbols; and each one of the at least two sub-sequences comprising at least one error-checking symbol for allowing a validity check of the symbols of the sub-sequence, the at least one error-checking symbol of each one of the at least two sub-sequences codes at least one parity bit, the parity bit obtained by performing a checksum of the symbols included in the corresponding sub-sequence.

19. The code support according to claim 18, wherein each sub-sequence of symbols within the first sequence is used to code distinct information related to the capsule.

20. The code support according to claim 18, comprising at least a second sequence of symbols, the second sequence comprising at least one second data sequence identical to the first data sequence of the first sequence.

21. A capsule intended for delivering a beverage in a beverage producing device by centrifugation comprising a code support to be associated with or part of the capsule, the support comprising a code formed by at least a first sequence of symbols, the code being represented on the support so that each symbol is sequentially readable by a reading arrangement of an external reading device while the capsule is driven in rotation about an axis of rotation:

the first sequence comprising at least one first data sequence formed by at least two subsequences of symbols; and each one of the at least two sub-sequences comprising at least one error-checking symbol for allowing a validity check of the symbols of the sub-sequence, the at least one error-checking symbol of each one of the at least two sub-sequences codes at least one parity bit, the parity bit obtained by performing a checksum of the symbols included in the corresponding sub-sequence.

22. The capsule according to claim 21, wherein each sub-sequence of symbols within the first sequence is used to code distinct information related to the capsule.

23. The capsule according to claim 21, comprising at least a second sequence of symbols, the second sequence comprising at least one second data sequence identical to the first data sequence of the first sequence.

24. A method for reading a code on a capsule intended for delivering a beverage in a beverage producing device by centrifugation comprising a flange-like rim comprising a code support adapted to be associated with or part of the capsule, the support comprising a code formed by at least a first sequence of symbols and a second sequence of symbols, the code being represented on the support so that each symbol is sequentially readable by a reading arrangement of an external reading device while the capsule is driven in rotation along an axis of rotation, the first sequence comprising at least one first preamble sequence of symbols and at least one first data sequence of symbols, the second sequence comprising at least one second preamble sequence of symbols and at least one second data sequence of symbols, and the first preamble sequence being distinct from the second preamble sequence, the method comprises:

identifying the position of the at least one first sequence and the at least one second sequence;

reading separately, with the reading arrangement, each symbol of the code, while driving the rotational driver so as to the capsule performs at least one complete revolution; and checking the validity of the read symbols and then determining a value for each sub-sequence of the sequence(s), using the error-checking symbols of each sub-sequence of each sequence.

* * * * *